United States Patent
Roggendorf et al.

(10) Patent No.: US 10,701,654 B1
(45) Date of Patent: Jun. 30, 2020

(54) TOKEN-BASED MODIFIED TDMA ALGORITHM

(71) Applicant: Rockwell Collins, Inc., Cedar Rapids, IA (US)

(72) Inventors: Brian R. Roggendorf, Marion, IA (US); John C. Herder, Cedar Rapids, IA (US); Edward C. Tubbs, Cedar Rapids, IA (US); Robert S. Wolterman, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 366 days.

(21) Appl. No.: 15/236,180

(22) Filed: Aug. 12, 2016

(51) Int. Cl.
*H04W 56/00* (2009.01)
*H04B 7/26* (2006.01)
*H04L 29/06* (2006.01)
*H04L 5/00* (2006.01)
*H04L 12/841* (2013.01)

(52) U.S. Cl.
CPC ...... *H04W 56/0025* (2013.01); *H04B 7/2643* (2013.01); *H04L 5/006* (2013.01); *H04L 47/28* (2013.01); *H04L 69/22* (2013.01)

(58) Field of Classification Search
CPC ............. H04W 56/0025; H04W 84/18; H04W 72/0446; H04B 7/2643; H04L 5/006; H04L 69/22
See application file for complete search history.

(56) References Cited

U.S. PATENT DOCUMENTS

| | | | |
|---|---|---|---|
| 7,596,113 B1* | 9/2009 | Kingston | H04W 56/003 370/320 |
| 2012/0155441 A1* | 6/2012 | Rousseau | H04W 72/10 370/337 |
| 2015/0003468 A1* | 1/2015 | Thubert | H04B 7/2643 370/442 |
| 2016/0226575 A1* | 8/2016 | Subramani | H04W 72/1226 |

\* cited by examiner

*Primary Examiner* — Ricky Q Ngo
*Assistant Examiner* — Stephen N Steiner
(74) *Attorney, Agent, or Firm* — Donna P. Suchy

(57) ABSTRACT

Embodiments of the inventive concepts disclosed herein are directed to systems and methods for managing network communications. A transceiver of a first node may receive, from a second node of the plurality of nodes, a transmission sequence generated according to a communications cost value determined for each pair of the nodes in the communications node. The transmission sequence may specify a third node followed by the first node as consecutive nodes for transmitting packets. A sequence manager of the first node may detect that reception of a terminal packet of the one or more packets from the third node has or should have just completed. The sequence manager may initiate transmission by the transceiver immediately upon the detection.

20 Claims, 5 Drawing Sheets

TOKEN-BASED MODIFIED TDMA ALGORITHM

BACKGROUND

Multiple communications nodes in networked environment may coordinate the transmission of data packets within a frequency channel using time division multiple access (TDMA). Under TDMA, each of the nodes may be assigned a time slot within which the node may broadcast or transmit packets to the other nodes of the network. No other nodes may transmit at the same time slot as another node. Since the propagation speed of transmissions is limited by the speed of light, the arrival time of the packets at each node may differ, with some nodes receiving the same packet at a much later time than other nodes. Because of this, the nodes that receive the packets earlier in time may wait a significant amount of time before receiving the next transmission. As such, time slot allocations may be implemented to accommodate and be fixed to when the last node within the network receives the packets. Due to the accommodation, the frequency channel capacity may be underutilized, thereby reducing the total effective network capacity. The reduction in the total effective network capacity may be exacerbated, if the time slots are lengthened to accommodate peak time demand, since some nodes may transmit data packets much shorter than the allocated time slot. Overcoming these technical challenges would allow for improved utilization of the frequency channel and increased effective total network capacity.

SUMMARY

In one aspect, and in accordance with the inventive concepts disclosed herein, embodiments of the inventive concepts disclosed herein are directed to a system for managing network communications. The system may utilize a modified TDMA scheme in scheduling or managing broadcasts by nodes of a network. The system may include a sequence allocator and a transceiver. The sequence allocator may be executed on one or more processors of a first communications node of a plurality of communications nodes. The sequence allocator may determine a communications cost value for each pair of communications nodes in the plurality of communications nodes to communicate with each other. The sequence allocator may generate, responsive to the communications cost value determined for each pair of the communications nodes, a transmission sequence specifying an order of transmission for the plurality of communications nodes. The transmission sequence may include having the first communications node followed by a second communications node as consecutive nodes to transmit packets. The transceiver may communicate the generated transmission sequence to the plurality of communications nodes. The communication of the generated transmission sequence may cause the first communications node to transmit one or more packets in turn according to the transmission sequence, and the second communications node to begin transmission immediately upon detecting that reception of a terminal packet of the one or more packets from the first communications node has or should have just completed.

In some embodiments, and in accordance with the inventive concepts disclosed herein, the sequence allocator may determine the communications cost value according to one or more of: distance or probability of line of sight between the corresponding pair of communications nodes. In some embodiments, and in accordance with the inventive concepts disclosed herein, the sequence allocator may determine the communications cost value according to one or more of: priority, altitude, transmission strength, receiver sensitivity or signal-to-noise ratio corresponding to at least one communications node of the corresponding pair of communications nodes. In some embodiments, and in accordance with the inventive concepts disclosed herein, the transceiver of the first communications node may transmit the one or more packets to others in the plurality of communications nodes.

In some embodiments, and in accordance with the inventive concepts disclosed herein, the sequence allocator may periodically determine a communications cost value for each pair of communications nodes in the plurality of communications nodes to communicate with each other. In some embodiments, and in accordance with the inventive concepts disclosed herein, the sequence allocator may determine an updated communications cost value for each pair of the communications nodes responsive to a change in physical location of one of communications nodes. In some embodiments, and in accordance with the inventive concepts disclosed herein, the sequence allocator may generate the transmission sequence to include a transmission length or maximum transmission length allocated for each transmission of at least some of the plurality of communications nodes.

In a further aspect, and in accordance with the inventive concepts disclosed herein, embodiments of the inventive concepts disclosed herein are directed to a system for managing network communications. The system may include a transceiver of a first communications node of a plurality of communications nodes and a sequence manager of the first communications node. The transceiver may receive, from a second communications node of the plurality of communications nodes, a transmission sequence generated according to a communications cost value determined for each pair of the communications nodes. The transmission sequence may specify a third communications node followed by the first communications node as consecutive nodes for transmitting packets. The transceiver may receive one or more packets transmitted by the third communications node according to the transmission sequence. The sequence manager may detect that reception of a terminal packet of the one or more packets from the third communications node has or should have just completed. The sequence manager may initiate transmission by the transceiver immediately upon the detection.

In some embodiments, and in accordance with the inventive concepts disclosed herein, the communications cost value may be determined according to one or more of: distance or probability of line of sight between the corresponding pair of communications nodes. In some embodiments, and in accordance with the inventive concepts disclosed herein, the communications cost value may be determined according to one or more of: priority, altitude, transmission strength, receiver sensitivity or signal-to-noise ratio corresponding to at least one communications node of the corresponding pair of communications nodes.

In some embodiments, and in accordance with the inventive concepts disclosed herein, the transceiver may periodically receive updates to the transmission sequence. In some embodiments, and in accordance with the inventive concepts disclosed herein, the transmission sequence may further specify a transmission length allocated to each transmission of the third communications node, the sequence manager configured to detect that reception of the terminal packet has or should have just completed according to the specified transmission length.

In a further aspect, and in accordance with the inventive concepts disclosed herein, embodiments of the inventive concepts disclosed herein are directed to a system for managing network communications. The system may include a first communications node of a plurality of communications nodes, the first communications node and a second communications node. The first communications node may have a transceiver. The first communications node may determine a communications cost value for each pair of communications nodes in the plurality of communications nodes to communicate with each other. The first communications node may generate, responsive to the communications cost value determined for each pair of the communications nodes, a transmission sequence. The transmission sequence may specify an order of transmission for the plurality of communications nodes that includes having the first communications node followed by a second communications node as consecutive nodes for transmitting packets. The first communications node may communicate, via the transceiver, the generated transmission sequence to the plurality of communications nodes, causing the first communications node to transmit one or more packets according to the transmission sequence. The second communications node may receive, from the first communications node, the transmission sequence. The second communications node may receive the one or more packets transmitted by the first communications node according to the transmission sequence. The second communications node may detect that reception of a terminal packet of the one or more packets from the first communications node has or should have just completed. The second communications node may initiate transmission immediately upon the detection according to the transmission sequence.

In some embodiments, and in accordance with the inventive concepts disclosed herein, the first communications node may determine each communications cost value according to one or more of: distance or probability of line of sight between the corresponding pair of communications nodes. In some embodiments, and in accordance with the inventive concepts disclosed herein, the first communications node may determine each communications cost value according to one or more of: priority, altitude, transmission strength, receiver sensitivity or signal-to-noise ratio corresponding to at least one communications node of the corresponding pair of communications nodes. In some embodiments, and in accordance with the inventive concepts disclosed herein, the first communications node may transmit the one or more packets to others in the plurality of communications nodes.

In some embodiments, and in accordance with the inventive concepts disclosed herein, a first sequence allocator of the first communications node and a second sequence allocator of a communications node from a second plurality of communications nodes may negotiate to have a first portion and a second portion of total network capacity allocated, respectively, to the first sequence allocator to manage communications of the plurality of communications nodes and, to the second sequence allocator to manage communications of the second plurality of communications nodes.

In some embodiments, and in accordance with the inventive concepts disclosed herein, the first communications node may determine an updated communications cost value for each pair of the communications nodes responsive to a change in physical location of one of the communications nodes. In some embodiments, and in accordance with the inventive concepts disclosed herein, the first communications node may generate the transmission sequence to include a transmission length or maximum transmission length allocated to each transmission of the first communications node, and the second communications node may detect that reception of the terminal packet has or should have just completed, for example according to the included transmission length. In some embodiments, and in accordance with the inventive concepts disclosed herein, the first communications node may allocate, according to a network capacity allocated to the plurality of communications nodes, a transmission length for each transmission of at least some of the plurality of communications nodes, and to include the allocated transmission length in the transmission sequence.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Figure 1:
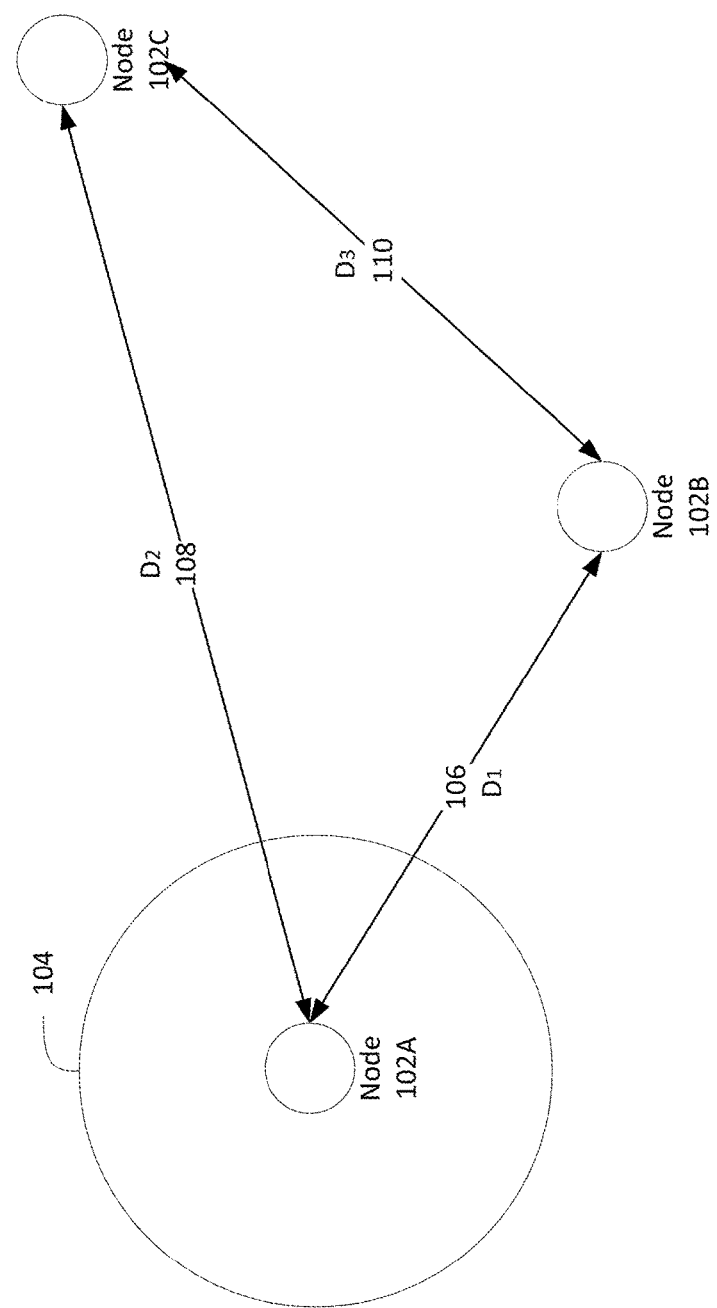
FIG. 1 is a block diagram of an example embodiment of a system for managing network communications, in accordance with some embodiments of the inventive concepts disclosed herein.

Before describing in detail embodiments of the inventive concepts disclosed herein, it should be observed that the inventive concepts disclosed herein include, but are not limited to a novel structural combination of components and circuits, and not to the particular detailed configurations thereof. Accordingly, the structure, methods, functions, control and arrangement of components and circuits have, for the most part, been illustrated in the drawings by readily understandable block representations and schematic diagrams, in order not to obscure the disclosure with structural details which will be readily apparent to those skilled in the art, having the benefit of the description herein. Further, the inventive concepts disclosed herein are not limited to the particular embodiments depicted in the schematic diagrams, but should be construed in accordance with the language in the claims.

In some aspects, embodiments of the inventive concepts disclosed herein are directed to a system of managing network communications. In a network environment, multiple communications nodes may communicate with one another on a frequency channel for instance, and may coordinate transmission of data with the frequency channel using TDMA-based time slot allocation. To leverage on at least some of the free air time between transmission of a packet by one node and receipt of the packet by all the other nodes in the network, the nodes may coordinate resource allocations (e.g., transmission time and/or packet length) of transmissions of data packets using a transmission sequence. The transmission sequence may specify the order in which the nodes of the network may transmit. The transmission sequence may allow for immediate, successive transmissions of packets by the node which is next closest in transmission distance (or communications cost value) to that of the previously transmitting node, subsequent to receiving all of the packets from the previously transmitting node. For example, the transmission sequence may specify an order of transmission for the nodes such that if a token is transmitted along a corresponding plurality of nodes in that order, the overall transmission path length or time (or other communications cost value) may be minimized. The transmission sequence may be generated by any one of the nodes based on a communications cost value for transmitting packets from one node to another node in the network. Each communications cost value may be calculated using various parameters, such as distance, transmission strength, and receive sensitivity, among others among the multiple communications nodes of the network. The transmission sequence may correspond to the minimum sum of the communications cost values and may also correspond to the optimal order of transmission among the nodes. Once distributed, the communications nodes may follow the transmission sequence to transmit data packets may in accordance with the transmission sequence. Because each of the communications nodes may transmit, immediately and successively after receiving the data packets from the previously transmitting node, utilization of allocated capacity (e.g., resources of a frequency channel) may be improved, thereby increasing the effective total network capacity.

Referring to FIG. 1, one example embodiment of a system 100 for managing network communications is depicted. The system 100 may correspond to a network environment that may include any number of communications nodes 102A-N. In the example illustrated in FIG. 1, there are three communications nodes, a first communications node 102A, a second communications node 102B, and a third communications node 102C, although the inventive concepts disclosed herein are not limited to any particular number of nodes. Each of the communications node 102A-N may include any form or type of computing device with communications capabilities and may be mobile or stationary. For example, a communications node 102A-N may include but not limited to a laptop, desktop computer, cellular/smart phone, tablet, vehicle (e.g., aircraft, automobile, watercraft, and spacecraft), robotic device, household/office/military appliance or device, satellite, or pseudolite.

In the network environment of system 100, each of the communications node 102A-N may transmit data packets to, and may receive data packets from, all of other communications nodes 102A-N in the group of nodes 102A-N and/or a given frequency channel for instance. The propagation distance of transmitted packets may differ among the communications nodes. As such, when a communications node 102A-N transmits a data packet, the wave front 104 of the signal carrying the data packet may arrive at different times at different communications nodes 102A-N. In the example depicted in FIG. 1, the propagation distance 106 between the first communications node 102A and the second communications node 102B may be $D_1$, the propagation distance 106 between the first communications node 102A and the third communications node 102C may be $D_2$, and the propagation distance 106 between the second communications node 102B and the third communications node 102C may be $D_3$. The propagation distance 106 may be less than the propagation distance 108 ($D_1 < D_2$). Further, the propagation distance 110 may be less than the propagation distance 110 ($D_3 < D_2$). In this example, when the first communications node 102A transmits a data packet to all the other communications nodes in the network environment of system 100, the wave front 104 of the signal carrying the data packet may arrive at the second communications node 102B prior to arriving at the third communications node 102C. As such, there may be some free time in the frequency channel between the first communications node 102A and the second communications node 102B, prior to the arrival of the data packet at the third communications node 102C. Using a transmission sequence, the communications nodes 102A-N may interoperate with one another and leverage the difference in arrival times of the wave front 104 carrying the data packet from one communications node 102A-N to all the other communications node.

Figure 2:
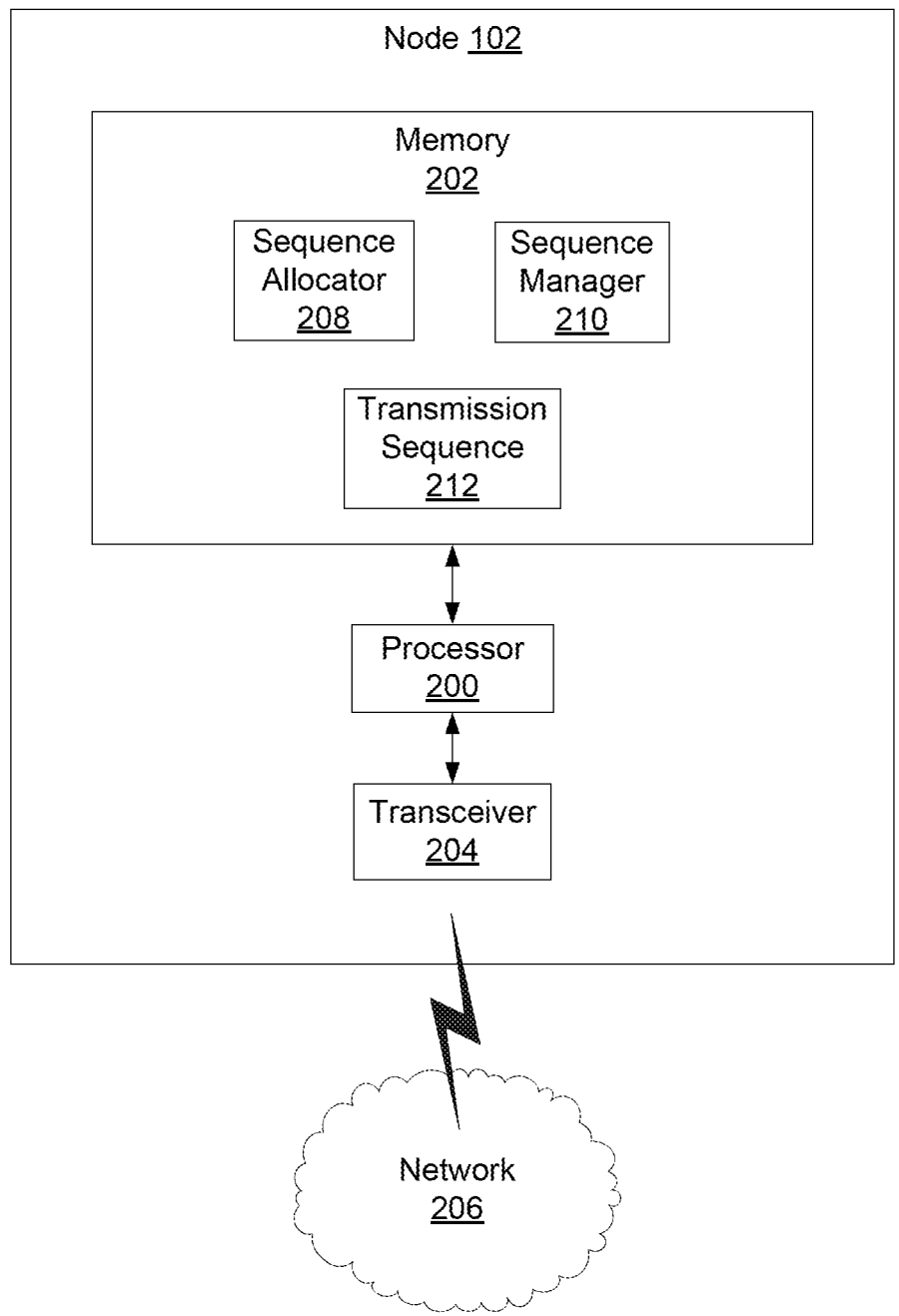
FIG. 2 shows a block diagram of an example embodiment of an architecture for communications nodes in a network environment of a system for managing network communications, in accordance with some embodiments of the inventive concepts disclosed herein.

Referring now to FIG. 2, an example embodiment of architectures for communications nodes 102A-N of the network in the system 100 for managing network communications is depicted. Each communications node 102 may include a processor 200, memory 202, and a transceiver 204, and be in communications with a network 206. The processor 200 may include a microprocessor unit, an application-specific integrated circuit (ASIC), and a field-programmable gate array (FPGA), among others. In some embodiments, the processor 202 may include a multi-core processor or an array of processors. The processor 202 may execute the programmable instructions stored on the memory 202, such as a sequence allocator 208 and a sequence manager 210. In some embodiments, the memory 202 may store or maintain a transmission sequence 212. The memory 202 may include electronic, optical, magnetic, or any other storage device capable of relaying or providing the processor 200 with program instructions, such as the sequence allocator 208, the sequence manager 210, and the transmission sequence 212. The transceiver 204 may include a transmitter to transmit data one or more packets to other communications nodes 102A-N via the network 206, and a receiver to receive one or more packets from the other communications nodes 102A-N via the network 206. The transmitter and the receiver of the transceiver 204 may include a built-in adapter, a wireless network adapter, universal serial bus (USB) network adapter, modem, or any other device capable of interfacing with the one or more other communications nodes 102A-N via the network 206 through a variety of connections. The network 206 may include other communications nodes 102A-N of the network environment of system 100.

To generate the transmission sequence 212, the sequence allocator 208 may determine or otherwise calculate a communications cost value for each pair of communications nodes 102A-N to communicate with each other via the network 206. The communications cost value may be indicative of a path-cost or a distance metric of transmitting one or more packets by one communications node 102A-N to the another communications node 102A-N. In some embodiments, the determination of the communications cost value may be determined by, or assigned or conveyed to one of the communications nodes 102A-N connected to the network 206. For example, one of the communications node 102A-N may be designated as a master communications node for calculating and/or distributing the communications cost value. In some embodiments, the determination of the communications cost value may be performed by at least a subset of the communications nodes 102A-N connected to the network 206. The communications nodes 102A-N that determine the communications cost value may directly or indirectly distribute or broadcast the respective determined communications cost value to the other communications nodes 102A-N.

In some embodiments, the communications cost value for each pair of communications nodes 102A-N may be bidirectional. For example, there may be a single communications cost value associated transmitting one or more packets between a first communications node 102A and a second communications node 102B. In some embodiments, the communications cost value for each pair of communications nodes 102A-N may be unidirectional. For example, there may be one communications cost value associated with the first communications node 102A transmitting one or more packets to a second communications node 102B and another communications cost value associated with the second communications node 102B transmitting one or more packets to the first communications node 102A. The communications cost value may change in time, for instance as a corresponding communications node 102 changes in location or priority relative to one or more other nodes.

The sequence allocator 208 may identify any number of factors to use in determining the communications cost value. The factors may generally relate to communication of one or more packets between a corresponding pair of communications nodes 102A-N. In some embodiments, the sequence allocator 208 may determine the communications cost value according to a distance between the corresponding pair of communications nodes 102A-N (e.g., propagation distances 106, 108, and 110). The distance may correspond to the propagation distance between the corresponding pair of communications nodes 102A-N. In some embodiments, the sequence allocator 208 may identify a location of each of the communications nodes 102A-N and may calculate a relative distance (e.g., Euclidean distance) between each corresponding pair of communications nodes 102A-N. In some embodiments, the sequence allocator 208 may determine the communications cost value according to a measured line of sight or a probability of line-of-sight between the corresponding pair of communications nodes 102A-N. The probability of line-of-sight may take into account diffractions, refractions, reflections, absorptions, or any other effects from the network environment on the wave front 104 of the signal carrying the transmission of the one or more packets from one communications node 102A-N to the other communications node 102A-N.

The factors used in determining the communications cost value may also include characteristics of the individual communications node 102A-N. In some embodiments, the sequence allocator 208 may identify characteristic information of each of the communications nodes 102A-N connected to the network 206. The characteristic information may include a transmission strength, a receiver sensitivity, an altitude, or a signal-to-noise ratio (SNR). In some embodiments, the sequence allocator 208 may receive characteristic information from each of the communications node 102A-N. Characteristic information may include the transmission strength, the receiver sensitivity, the altitude, or the SNR of the respective communications node 102A-N. In some embodiments, the sequence allocator 208 may determine, adjust and/or weigh the determined communications costs value for the corresponding communications node 102A-N based on one of the characteristic information for at least one of the communications node 102A-N.

In some embodiments, the sequence allocator 208 may determine the communications cost value according to the transmission strength of at least one communications node 102A-N in the corresponding pair of communications nodes 102A-N. The transmission strength may also be referred to as field strength or signal strength, and may be indicative of the transmitter power output of the transmitter of the respective communications node 102A-N. For example, the transmission strength of some communications nodes 102A-N connected to the network 206 may different that of other communications nodes 102A-N. The communications cost value of communications nodes 102A-N with weaker transmission strengths may be higher than those communications nodes 102A-N with stronger transmission strengths, allowing the communications nodes 102A-N with stronger transmissions strengths to communicate or repeat the one or more packets of the communications nodes 102A-N with lower transmission levels. In some embodiments, the sequence allocator 208 may determine the communications cost value according to the receiver sensitivity of at least one communications node 102A-N in the corresponding pair of communications nodes 102A-N. The receiver sensitivity may correspond to the minimum strength of the signal carrying the one or more packets detectable and/or that can be processed by the respective communications node 102A-N.

In some embodiments, the sequence allocator 208 may determine the communications cost value according to the altitude of the at least one of communications node 102A-N in the corresponding pair of communications nodes 102A-N. The altitude may correspond to the height or depth location of the respective communications node 102A-N, relative to a reference (e.g., sea or ground level). In some embodiments, the sequence allocator 208 may determine the communications cost value according to the SNR of the at least one of communications node 102A-N in the corresponding pair of communications nodes 102A-N. The SNR may be measured by each communications node 102A-N using the transmission strength and a background noise strength.

The factors used in determining the communications cost value may include a priority of the one or more packets to be transmitted by the respective communications node 102A-N. The priority may indicate a measure of importance, service level and/or urgency of information in the one or more packets to be transmitted by the individual communications node 102A-N. The priority may also indicate a measure of importance, service level and/or urgency of the communication between a corresponding pair of communications nodes 102A-N. In some embodiments, the sequence allocator 208 may determine the communications cost value according to the priority of the at least one of communications node 102A-N in the corresponding pair of communications nodes 102A-N. In some embodiments, the sequence allocator 208 may determine, adjust and/or weight the determined communications cost value by the priority of the one or more packets to be transmitted by the respective communications node 102A-N. If the priority of the one or more packets to be transmitted by the respective communications node 102A-N is low relative to that of at least another node or to a predetermined reference, the sequence allocator 208 may increase the determined communications cost value of the respective communications node 102A-N transmitting to the other communications nodes 102A-N. If the priority of the one or more packets to be transmitted by the respective communications node 102A-N is high relative to that of at least another node or to a predetermined reference, the sequence allocator 208 may decrease the determined communications cost value of the respective communications node 102A-N transmitting with the other communications nodes 102A-N.

In some embodiments, the sequence allocator 208 may compare the priority for the respective communications node 102A-N to a predefined threshold. In some embodiments, the sequence allocator 208 may determine, weight and/or adjust the determined communications cost value for the corresponding pair of communications node 102A-N based on the comparison of the priority with the predefined threshold. For example, if the priority of the one or more packets is determined to be above the predefined threshold, indicating high importance for instance, the sequence allocator 208 may set the determined communications cost value of the respective communications node 102A-N transmitting with the other communications nodes 102A-N to null for example. If the priority of the one or more packets is determined to be below the second predefined threshold, indicating low importance for instance, the sequence allocator 208 may set the determined communications cost value of the respective communications node 102A-N transmitting with the other communications nodes 102A-N to increase the communications cost value by a multiplicative factor.

The sequence allocator 208 may generate the transmission sequence 212 based on the communication cost value determined for each pair of the communications nodes 102A-N. The transmission sequence 212 may be a data structure, such as an array, table, matrix, linked list, ordered list, heap, binary tree, and skip list, among others. The transmission sequence 212 may specify an order of transmission (or "token") for the communications nodes 102A-N in the network 206. The order of transmission may include having one communications node followed by the next communications node 102A-N as consecutive nodes to transmit one or more packets. The transmission sequence 212 may allow the communications nodes 102A-N in the network 208 to successively transmit packets by one communications node 102A-N after another communications node 102A-N within a single transmission frame or a repeatable cycle amongst the nodes 102A-N. The transmission frame may correspond to an amount of time to cycle through transmissions of packets by each of the communications nodes 102A-N. To determine the order of transmission for the transmission sequence 212, the sequence allocator 208 may identify a minimum or optimal sum of communication cost values spanning the communications nodes 102A-N in the network 206. The minimum or optimal sum of the communications cost value may be to minimize or optimize loss of network capacity to signal propagation, and may yield the shortest (or shortest average) travel distance or cost from one communications node 102A-N to another communications node 102A-N.

In some embodiments, the sequence allocator 208 may generate any type or form of a graph, model, representation or transmission sequence tree (hereafter generally referred to as a graph), including the communications cost values and the corresponding pair of communications nodes 102A-N. Each edge of the graph may correspond to the communication costs value and each node of the graph may correspond to one of the communications nodes 102A-N. The edges of the graph may be bidirectional or unidirectional. In some embodiments, the sequence allocator 208 may determine one or more paths through the graph that traverse all of the nodes. In some embodiments, the sequence allocator 208 may identify an optimal path from the one or more paths corresponding to the minimum or optimal sum of communications cost values through the graph. The optimal path may include a sequence of nodes through edges with the minimum or optimal sum of communications cost value. In some embodiments, the sequence allocator 208 may identify the order of transmission for the transmission sequence from the optimal path through the edges and nodes of the graph.

Figure 3:
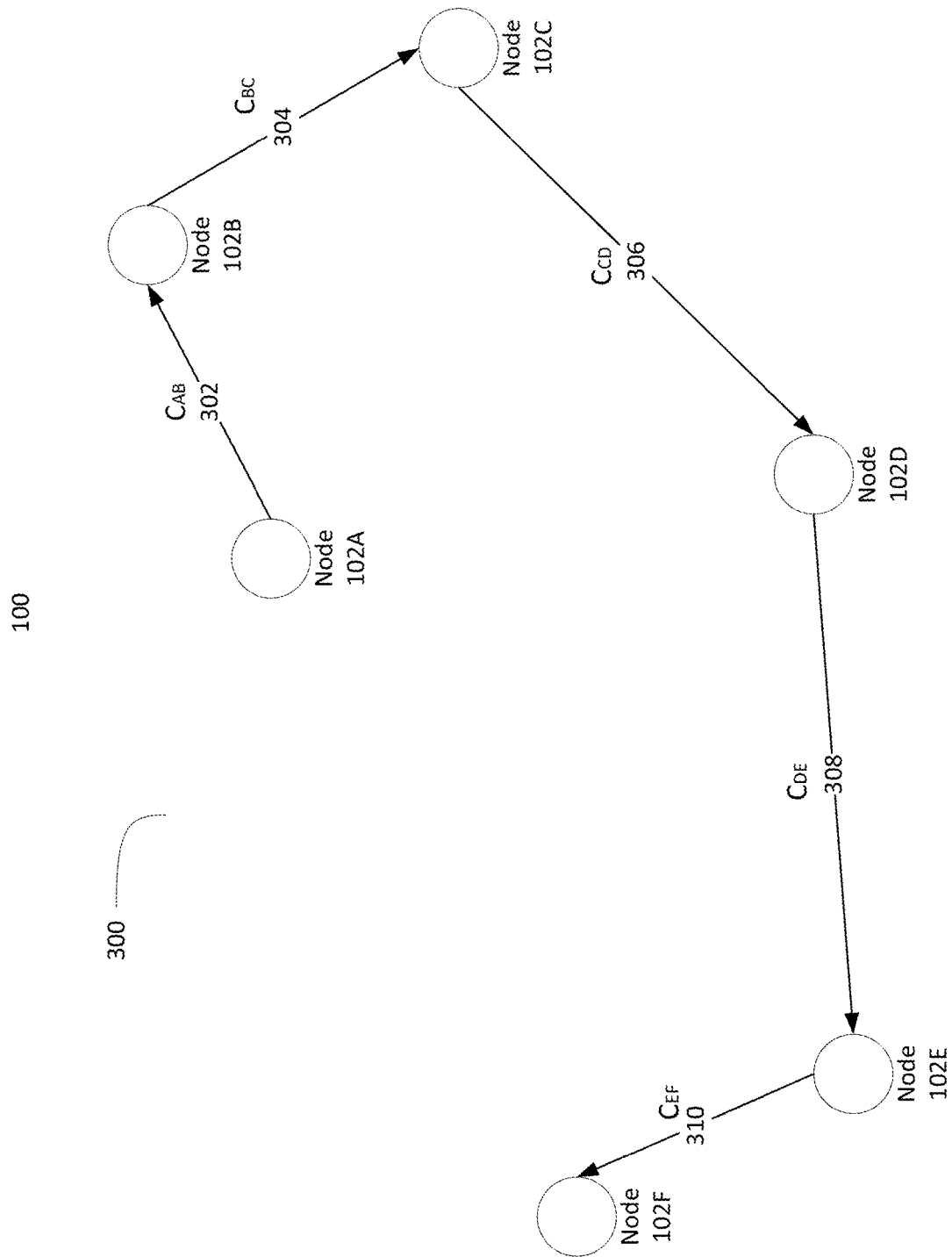
FIG. 3 shows a block diagram of another example embodiment of a system for managing network communications, in accordance with some embodiments of the inventive concepts disclosed herein.

Referring now to FIG. 3, depicted is one embodiment of a system 100 for managing network communications. One communications node 102A may identify a transmission sequence (e.g., corresponding to an optimal order of transmission 300 across the communications node 102B-F of the network 206), in accordance with some embodiments of the inventive concepts disclosed herein. In the example depicted in FIG. 3, the network environment of system 100 may include six communications nodes 102A-F with the optimal order of transmission 300 identified between the corresponding pairs of communications nodes 102A-F. In the context of FIG. 2, the sequence allocator 208 may have generated a graph with nodes and edges. Each node may represent a respective communications node 102A-F. Each edge may connect all of the nodes to one another and may represent a unidirectional communications cost value for transmitting one or more packets between the corresponding pair of communications nodes 102A-F. Using a dynamic programming algorithm (e.g., Dijkstra's algorithm, Greedy algorithm, depth-first search, Kruskal's algorithm, etc.), the sequence allocator 208 may have identified, determined or calculated an optimal path with the lowest sum of communications cost values through the graph. The optimal path identified from the graph may correspond to the optimal order of transmission 300. In the example here, the lowest sum of communications cost values may be the sum of the costs 302 ($C_{AB}$), 304 ($C_{BC}$), 306 ($C_{CD}$), 308 ($C_{SE}$), and 310 ($C_{EF}$). The optimal order of transmission 300 identified using the graph may be from first to last: the first communications node 102A, the second communications node 102B, the third communications node 102C, the third communications node 102D, the fourth communications node 102D, the fifth communications node 102E, and then the sixth communications node 102F. The sequence allocator 208 may generate the transmission sequence 212 using the optimal order of transmission 300 identified from the graph.

Referring back to FIG. 2, in some embodiments, the transmission sequence 212 may include a transmission length allocated for each transmission of the one or more communications nodes 102A-N. The transmission length may specify an amount of time for the respective communications node 102A-N to transmit to the one or more packets to the other communications nodes 102A-N. In some embodiments, the sequence allocator 208 may identify a number of the one or more packets to be transmitted by each of the communications nodes 102A-N in the network 206. In some embodiments, the sequence allocator 208 may set the transmission length allocated for each transmission based on the number of one or more outgoing/transmission packets identified or expected for each communications node 102A-N. For example, each packet may correspond to a fixed amount of time. The sequence allocator 208 may for instance multiply the number of the one or more packets to be transmitted by the fixed amount of time, to provide the transmission length for a corresponding communications node.

In some embodiments, the sequence allocator 208 may set a maximum transmission length for each transmission of packets by each communications node 102A-N. The maximum transmission length may specify a maximum number of packets permitted to be transmitted by each communications node 102A-N within the single transmission frame of the transmission sequence 212. In certain embodiments, a communications node specified with a maximum transmission length may transmit any number of packets up to the maximum transmission length. If the communications node transmits less than the maximum transmission length, a next communications node in the transmission sequence may detect for complete reception of the transmitted nodes, and may itself begin or perform transmission immediately upon reception of all the transmitted nodes. In some embodiments, the sequence allocator may determine the transmission sequence at the beginning of each frame, allowing the sequence to be dynamic rather than predetermined. The sequence allocator 208 may specify a hold-off interval based on the maximum number of transmissions. This hold-off interval may start from the reception of the transmission of the previous node, to deal with the case where a node may be otherwise unable to receive from the prior node. This hold-off interval may accommodate communications nodes 102A-N outside the transmission range of the communications node 102A-N transmitting the one or more packets for instance. For example, the third communications node 102C may be outside the transmission range of the first communications node 102A, but the second communications node 102B may be. In this scenario, in the time between receipt of the packets from the first communications node 102A and receipt of packets from another communications node provided by the maximum transmission length, the second communications node 102B may transmit the received packets to the third communications node 102C. In some embodiments, the sequence allocator 208 may set a minimum transmission length for each transmission of packets by each communications node 102A-N. The minimum transmission length may specify a minimum number of packets permitted to be transmitted by each of the communications nodes 102A-N. The minimum transmission length may indicate that a communications node that is next in the transmission sequence cannot begin transmission before that minimum number of packets is received from the prior communications node in the transmission sequence, or before that minimum transmission length has elapsed beginning from the first received packet.

In some embodiments, the sequence allocator 208 may allocate or set the transmission length according to a network capacity allocated to a subset of the communications nodes 102A-N. For example, different portions of a network's total capacity may be allocated to different groups or subsets of communications nodes in the network, or allocated to respective sequence allocators for managing network communications of the corresponding groups or subsets of communications nodes. The network capacity may correspond to a total number of packets that may be transmitted by at least some of the communications nodes 102A-N in the frequency channel for the network 206 in the transmission frame of the transmission sequence 212. The sequence allocator 208 of one communications node 102A-N may manage communications for the subset of the communications nodes 102A-N. For example, the sequence allocator 208 of the first communications node 102A or a designated master communications node 102A-N may generate and distribute the transmission sequence 212 to all the communications nodes 102A-N of the subset of communications nodes 102A-N.

In some embodiments, the sequence allocator 208 of one communications node 102A-N may negotiate with the sequence allocator 208 of a second communications node 102A-N to manage communications among respective subsets of communications nodes 102A-N. In some embodiments, in negotiating to manage communications among respective subsets of communications nodes 102A-N, the sequence allocator 208 of one communications node 102A-N and the sequence allocator 208 of the second communications nodes 102A-N may partition a total network capacity for the network 206 across the subsets of communications nodes 102A-N into one or more portions based on an expected number of packets to be transmitted and/or other factors (e.g., types and/or priority of data or content being communicated). For example, the expected number of packets to be transmitted by the first subset of communications nodes 102A-N may be greater than the expected number of packets to be transmitted by the second subset of communications nodes 102A-N. In this illustrative case, the sequence allocator 208 of the first communications node 102A may be allotted a first portion and the sequence allocator 208 of the second communications node 102B may be allotted a second portion of the total network capacity less than the first portion. Using the allotted portions, the sequence allocator 208 of the first communications node 102A may set the transmission length (or maximum transmission length) for the transmission sequence 212 accordingly. In some embodiments, a network capacity manager of the network and/or the sequence allocator 208 of one communications node 102A-N may assign one or more communications node 102A-N from one subset to another subset of communications nodes 102A-N.

The transceiver 204 may communicate or otherwise distribute the transmission sequence 212 to the other communications nodes 102A-N in the network 206. In some embodiments, the transceiver 204 may transmit the transmission sequence 212 to the other communications nodes 102A-N in the network 206, subsequent to the sequence allocator 208 generating the transmission sequence 212 or receiving the transmission sequence 212 from another communications node 102A-N. In some embodiments, the transceiver 204 may receive the transmission sequence 212 from one of the other communications nodes 102A-N in the network, subsequent to the other communications node 102A-N generating the transmission sequence 212 or receiving the transmission sequence 212 from yet another communications node 102A-N.

The transceiver 204 may transmit one or more packets to the other communications nodes 102A-N in the network in accordance with the transmission sequence 212. The transceiver 204 may receive one or more packets from the other communications nodes 102A-N in the network in accordance with the transmission sequence 212. Each of the one or more packets may be assigned a sequence number by the transceiver 204 or the sequence manager 210. The sequence number may indicate an order or a position within the one or more packets for transmission. The sequence number may be ascending or descending relative to the last packet in the one or more packets to be transmitted by the respective communications nodes 102A-N. For example, if there were three packets to be transmitted, the first packet to be transmitted may be labeled "3", the second packet "2", and the last packet "1."

The sequence manager 210 may transmit, via the transceiver 204, one or more packets to other communications nodes 102A-N in the network 206 in turn according to the transmission sequence 212. The sequence manager 210 may read or otherwise interpret the transmission sequence 212, responsive to receipt or generation of the transmission sequence 212. In some embodiments, the sequence manager 210 may determine or identify a position number of the respective communications node 102A-N from the order of transmission in the transmission sequence 212. The position number may indicate a position or a rank within the order of transmission of the transmission sequence 212 for the respective communications node 102A-N. In some embodiments, the sequence manager 210 may identify the transmission length for transmissions of one or more packets by the respective communications node 102A-N from the transmission sequence 212. In some embodiments, the sequence manager 210 may determine the number of one or more packets that the respective communications node 102A-N may transmit under the transmission length specified by the transmission sequence 212. In some embodiments, the sequence manager 210 may identify the total network capacity allotted to the subset to which the respective communications node 102A-N belongs to, from the transmission sequence 212.

The sequence manager 210 may detect a terminal packet of the one or more packets received via the transceiver 204 from another communications node 102A-N. The terminal packet may correspond to the last packet of the one or more packets transmitted by other communications node 102A-N. In some embodiments, the sequence manager 210 may detect that reception of the terminal packet by the transceiver 204 has or should have just completed according the transmission length specified in the transmission sequence 212 and/or information in the received packet(s), such as a token or identifier indicating an end-of-transmission or identifying the terminal packet. In some embodiments, the sequence manager 210 may detect, determine, or calculate a time of a final boundary of the terminal packet. The terminal offset may correspond to the time at which a signal of the terminal packet drops in magnitude. The sequence manager 210 may determine a completion of transmission from a prior communications node according to the absence of detected signals or of signals below a predetermined threshold signal level. In some embodiments, the sequence manager 210 may calculate the time of the final boundary of the terminal packet based on the transmission length specifying the maximum number of the one or more packets from the transmission sequence 212.

In some embodiments, the sequence manager 210 may identify the sequence number for each of the one or more packets received. In some embodiments, the sequence manager 210 may determine whether the sequence numbers between each of the one or more packets are increasing or decreasing. In some embodiments, and by way of a non-limiting example, the sequence manager 210 may determine whether the packet received from the other communications node 102A-N is the terminal packet based on the sequence number and/or the determination of whether the sequence numbers are increasing or decreasing. In some embodiments, if the sequence numbers are increasing, the sequence manager 210 may compare the sequence number of the received packet to the transmission length specifying the maximum number of packets to determine whether the received packet is the terminal packet. If the sequence number of the corresponding received packet is equal to the maximum number, the sequence manager 210 may determine that the corresponding received packet is the terminal packet. In some embodiments, if the sequence numbers of decreasing, the sequence manager 210 may compare the sequence number of the received packet to an initial index value (e.g., null or one) to determine whether the received packet is the terminal packet. If the sequence number is equal to the initial index value, the sequence manager 210 may determine that the corresponding received packet is the terminal packet. In some embodiments, the sequence manager 210 may determine that the received packet is a penultimate packet based on the sequence number and/or the determination of whether the sequence numbers are increasing or decreasing.

Immediately subsequent to detecting receipt of the terminal packet, the sequence manager 210 may initiate transmission of one or more packets, via the transceiver 204, to the other communications nodes 102A-N. As detailed above, each of the one or more packets may be assigned a sequence number. In some embodiments, the sequence manager 210 may initiate transmission of the one or more packets via the transceiver 204, subsequently to detecting that the reception of the terminal packet has or should have just completed. In some embodiments, the sequence manager 210 may transmit at least a first packet of the one or more packets, subsequent to detecting the receipt of the terminal packet. In some embodiments, the sequence manager 210 may preprocess or pre-buffer at least the first packet of the one or more packets, subsequent to detecting the penultimate packet and prior to detecting the terminal packet from one of the other communications nodes 102A-N. Subsequent to the transmission of the first packet, the sequence manager 210 may continue to transmit, via the transceiver 204, a remainder of the one or more packets to the other communications nodes 102A-N.

The transmission sequence 212 may be updated or modified repeatedly, periodically or dynamically. The sequence allocator 208 may be triggered (e.g., at a certain time or according to a particular condition) to determine an updated communications cost value for each pair of communications nodes 102A-N in the network 206. In some embodiments, the sequence allocator 208 may periodically determine the updated communications cost value for the corresponding pair of communications nodes 102A-N. In some embodiments, the sequence allocator 208 may determine, identify, or otherwise detect an onset of the transmission frame of the transmission sequence 212. The onset may include a time window shortly before a time of the transmission frame of the transmission sequence 212. In some embodiments, the sequence allocator 208 may determine an updated communication costs value, upon detecting the onset of the transmission frame of the transmission sequence 212. The sequence allocator 208 may determine the updated communications cost value for corresponding pairs of communications nodes 102A-N based on a subsequent change in, or addition and/or removal of at least one of the various factors for the corresponding pairs of communications node 102A-N discussed herein, for example at least one of the various factors used to determine the previous communications cost value. The various factors may include a propagation distance (e.g., distances 106, 108, and 110 of FIG. 1), a measured line-of-sight, a probability of line-of-sight, transmission strength, a receiver sensitivity, an altitude, SNR, or priority. In some embodiments, the sequence allocator 208 may identify a change in physical location of any of the communications nodes 102A-N. The sequence allocator 208 may generate an updated transmission sequence 212 based on the updated communications cost values for each pair of the communications nodes 102A-N. In addition, the functionalities of the communications nodes 102A-N, such as the sequence allocator 208, the sequence manager 210, the transmission sequence 212, and transceiver 204, may be repeated any number of times across the communications nodes 102A-N for instance.

Figure 4:
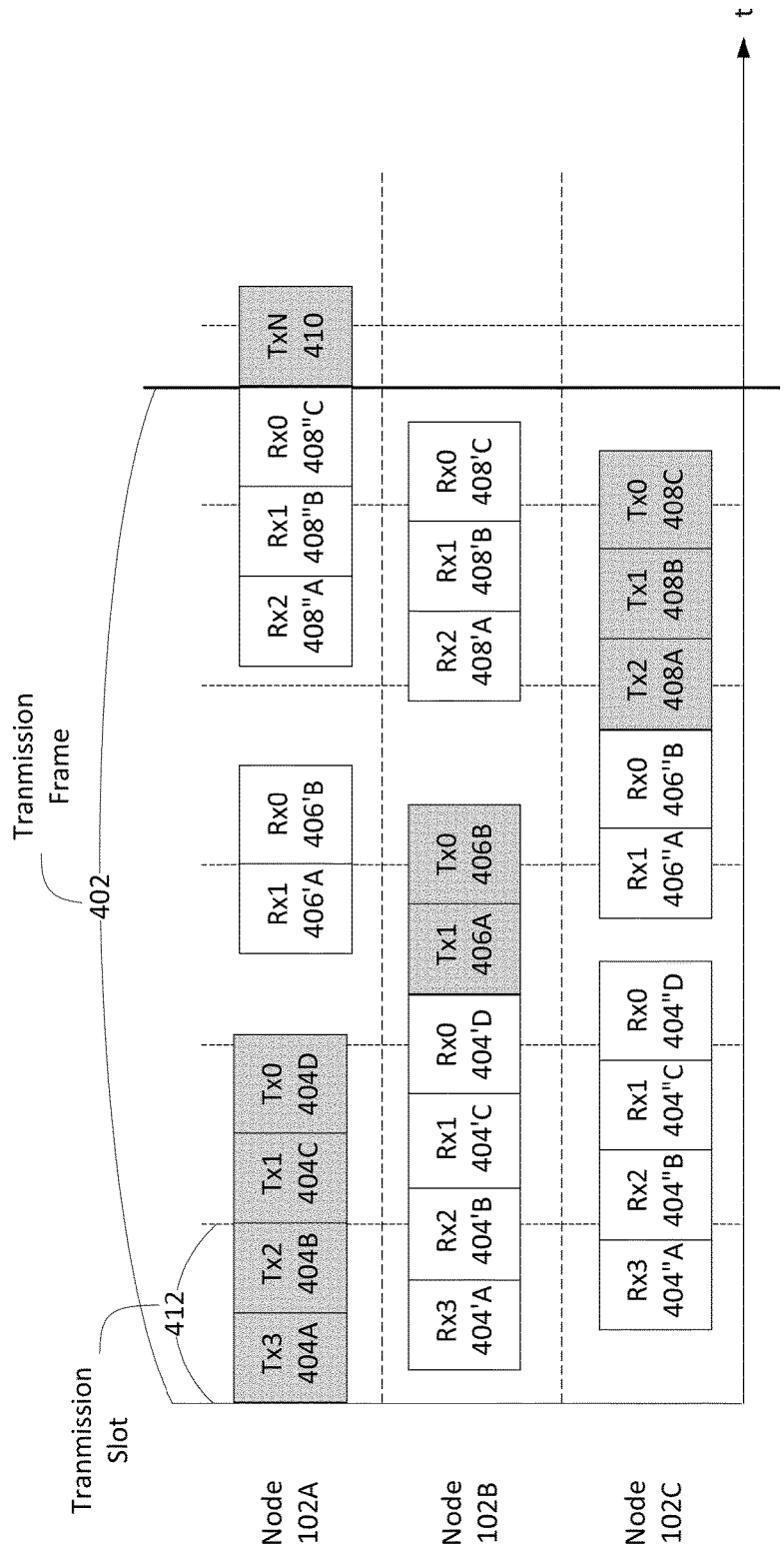
FIG. 4 shows a time graph of an example embodiment of a system for managing network communications, in accordance with some embodiments of the inventive concepts disclosed herein.

Referring now to FIG. 4, depicted is one illustrative embodiment of a time graph 400 with three communications nodes 102A-C transmitting and receiving one or more packets in accordance with the generated and distributed transmission sequence 212, in accordance with some embodiments of the inventive concepts disclosed herein. In the example depicted in FIG. 4, the transmission sequence 212 may specify that the first communications node 102A is to transmit packets first, followed by the second communications node 102B, and subsequently by the third communications node 102C. The transmission sequence 400 may have been generated by any one of the communications nodes 102A-C based on various factors, including physical distance, such as the relative distances 106, 108, and 110 depicted in FIG. 1. While transmitting, each of the three communications nodes 102A-C may assign sequence numbers to their respective packets in descending order from highest to zero for instance.

In accordance with the transmission sequence 212 in this non-limiting example, the first communications node 102A may transmit four packets 404A-D. In transmitting the packets, the first communications node 102A may assign the first packet 404A, the sequence number of "3"," the second packet 404B "2", the third packet 404C "1", and the fourth and terminal packet "0." The first communications node 102A may be more physically proximate to the second communications node 102B than to the third communications node 102C. Consequently, the time of arrival of the packets 404A-D may be shorter at the second communications node 102B than the third communications node 102C, as shown on the relative position in time of packets 404'A-D arriving at the second communications node 102B and of packets 404"A-D arriving at the third communications node 102C. After the first communications node 102A has completed transmitting packets 404A-D, the transmission sequence 212 may indicate that the second communication node 102B is to transmit packets next.

The second communications node 102B may detect 404'D as the terminal packet from the sequence number. Immediately after receipt of the fourth packet 404'D, the second communications node 102B may commence sequential transmission of two packets 406A and 406B, in accordance with the transmission sequence 212. The second communications node 102B may be more physically proximate to the first communications node 102A than to the third communications node 102C. As such, the time of arrival of the packets 406A and 406B may be shorter at the first communications node 102A than the third communications node 102C, as shown on the relative position in time of packets 406'A and 406'B arriving at the first communications node 102A and of packets 406"A and 406"B arriving at the third communications node 102C. After the second communications node 102B has completed transmitting packets 406A and 406B, the transmission sequence 212 may indicate that the third communication node 102C is to transmit packets next.

Similarly, the third communications node 102C may identify 406"B as the final packet of transmissions by the second communications node 102B using the sequence number in the packet. Immediately subsequent to receipt of the second packet 406"B, the third communications node 102C may initiate sequential transmission of for example three packets 408A-C to the first communications node 102A and the second communications node 102B. The third communications node 102C may be more physically proximate to the second communications node 102B than to the first communications node 102A. Therefore, the time of arrival of the packets 408A-C may be shorter at the second communications node 102B than the second communications node 102B, as shown on the relative position in time of packets 408'A-C arriving at the first communications node 102A and of packets 408"A-C arriving at the first communications node 102A. The transmission sequence 212 may be also repeated again so that the first communications node 102A transmits packet 410. In addition, at least one of the communication nodes 102A-C may generate a newly updated transmission sequence 212 for use by the communications nodes 102A-C.

This successive transmissions by the three communications node 102A-C may complete the illustrative transmission frame 402 of the transmission sequence 212. The transmission frame 402 of the transmission sequence 212 may allow more packets, and thus greater network capacity than the transmission slot 412 found in conventional TDMA implementations. Furthermore, in comparison to using the transmission slot 412, use of the transmission sequence 212 may reduce dead air time due to propagation time and may increase network capacity from actual use versus predicted or expected demand.

Figure 5:
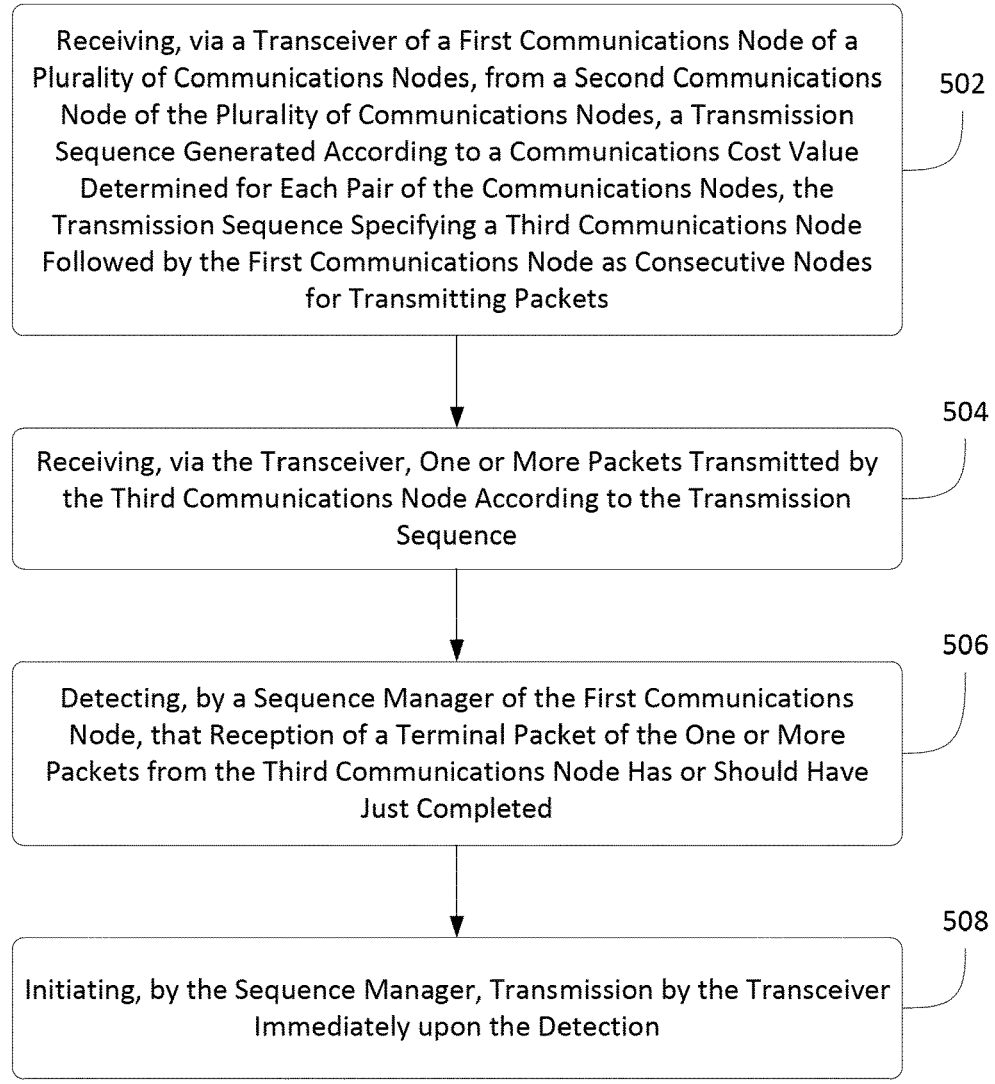
FIG. 5 shows a flow diagram of an example embodiment of a method for managing network communications, in accordance with some embodiments of the inventive concepts disclosed herein.

Now referring to FIG. 5, one embodiment of a method 500 of managing network communications is depicted. The functionalities of method 500 may be implemented by any of the computing devices and system architectures depicted in FIGS. 1 and 2. In brief summary, a transceiver of a first communications node of a plurality of communications nodes may receive, from a second communications node of the plurality of communications nodes, a transmission sequence generated according to a communications cost value determined for each pair of the communications nodes (502). The transmission sequence may specify a third communications node followed by the first communications node as consecutive nodes for transmitting packets. The transceiver may receive one or more packets transmitted by the third communications node according to the transmission sequence (504). The sequence manager may detect that reception of a terminal packet of the one or more packets from the third communications node has or should have just completed (506). The sequence manager may initiate transmission by the transceiver immediately upon the detection (508).

In further detail, referring now to step 502, and in some embodiments, a transceiver of a first communications node of a plurality of communications nodes may receive, from a second communications node of the plurality of communications nodes, a transmission sequence generated according to a communications cost value determined for each pair of the communications nodes. The transmission sequence may specify a third communications node followed by the first communications node as consecutive nodes for transmitting packets. For example, a sequence allocator 208 of the second communications node 102B may determine a communications cost value for each pair of the plurality of communications nodes 102A-N using any number of factors. The factors used to determine the communications cost value may include a propagation distance, a measured line-of-sight, a probability of line-of-sight, transmission strength, a receiver sensitivity, an altitude, SNR, or a priority for transmissions of packets by the respective communications node 102A-N. The sequence allocator 208 of the second communications node 102B may generate a transmission sequence 212 based on the communications cost value determined for each pair of the communications nodes 102A-N. The second communications node 102B may transmit the transmission sequence 212 to the first communications node 102A and to the third communications node 102C.

Referring now to step 504, and in some embodiments, the transceiver may receive one or more packets transmitted by the third communications node according to the transmission sequence. For example, in accordance with the distributed transmission sequence 212, the third communications node 102C may transmit one or more packets to the first communications node 102A and to the second communications node 102B. Each of the one or more packets transmitted by the third communications node 102C may be assigned or be associated with a sequence number indicating a position of the respective packet within the one or more packets. The sequence number may be ascending or descending relative to the last packet of the one or more packets transmitted.

Referring now to step 506, and in some embodiments, the sequence manager may detect that reception of a terminal packet of the one or more packets from the third communications node has or should have just completed. For example, as the first communications node 102A receives the one or more packets from the third communications node 102C, a sequence manager 210 of the first communications node 102A may identify the sequence number from each received packet. The sequence manager 210 may determine a most recently received packet as the terminal packet based on the sequence number and/or a transmission length specified in the transmission sequence 212.

Referring now to step 508, and in some embodiments, the sequence manager may initiate transmission by the transceiver immediately upon the detection. The sequence manager may initiate transmission by the transceiver immediately upon the detection, without waiting for a corresponding maximum transmission length to end. In some embodiments, and by way of illustration, upon determining that the first communications node 102A is to transmit in accordance with the transmission sequence 212, the sequence manager 210 of the first communications node 102A may pre-process and/or pre-load at least a first packet of the one or more packets to be transmitted to the plurality of the communications nodes 102A-N upon detecting the terminal packet. Once receipt of the terminal packet is completed, the sequence manager 210 may then commence transmitting of the one or more packets successively to the plurality of the communications nodes 102A-N. The sequence manager may initiate transmission of the first packet by the transceiver upon detecting reception of the terminal packet, so that the transmission of the first packet abuts the reception of the terminal packet in time, without any time gap or any significant time gap. In some embodiments, the first packet is transmitted after a short latency corresponding to a predetermined buffer or transition period. In some embodiments, the first packet is transmitted some amount of time after reception of the terminal packet, according to a specified hold-off period.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the inventive concepts disclosed herein. The order or sequence of any operational flow or method operations may be varied or re-sequenced according to alternative embodiments. Other substitutions, modifications, changes, and omissions may be made in the design, operating conditions and arrangement of the exemplary embodiments without departing from the broad scope of the inventive concepts disclosed herein.

The inventive concepts disclosed herein contemplate methods, systems and program products on any machine-readable media for accomplishing various operations. Embodiments of the inventive concepts disclosed herein may be implemented using existing computer operational flows, or by a special purpose computer operational flows for an appropriate system, incorporated for this or another purpose, or by a hardwired system. Embodiments within the scope of the inventive concepts disclosed herein include program products comprising machine-readable media for carrying or having machine-executable instructions or data structures stored thereon. Such machine-readable media can be any available media that can be accessed by a special purpose computer or other machine with an operational flow. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with an operational flow. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a special purpose computer, or special purpose operational flowing machines to perform a certain function or group of functions.

What is claimed is:

1. A system for managing network communications, the system comprising:
 a sequence allocator executed on one or more processors of a first communications node of a plurality of communications nodes, the sequence allocator configured to:
  determine a communications cost value for each pair of communications nodes in the plurality of communications nodes to communicate with each other;
  generate, based on the communications cost value determined for each pair of the communications nodes, a transmission sequence specifying an order of transmission for the plurality of communications nodes, the order of transmission indicating that the first communications node is to be followed by a second communications node as consecutive nodes to transmit packets; and
 a transceiver of the first communications node, configured to:

initiate transmission of one or more first packets to other communication nodes of the plurality of communication nodes according to the transmission sequence; and communicate the transmission sequence to the other communication nodes of the plurality of communications nodes to communicate according to the transmission sequence, receipt of the transmission sequence to cause the second communications node to:

identify, from the transmission sequence, the second communications node as following the first communication node as consecutive nodes in the order of transmission;

determine that a packet of the one or more first packets received from the first communications node is a terminal packet, initiate, responsive to identifying the second communications node from the transmission sequence and to determining that the packet is the terminal packet, transmission of one or more second packets.

2. The system of claim 1, wherein the sequence allocator is configured to determine the communications cost value according to one or more of: distance or probability of line of sight between the corresponding pair of communications nodes.

3. The system of claim 1, wherein the sequence allocator is configured to determine the communications cost value according to one or more of: priority, altitude, transmission strength, receiver sensitivity or signal-to-noise ratio corresponding to at least one communications node of the corresponding pair of communications nodes.

4. The system of claim 1, wherein the transceiver of the first communications node is configured to transmit the one or more packets to other communication nodes in the plurality of communications nodes.

5. The system of claim 1, wherein the sequence allocator is further configured to periodically determine an updated communications cost value for each pair of communications nodes in the plurality of communications nodes to communicate with each other.

6. The system of claim 1, wherein the sequence allocator is further configured to determine an updated communications cost value for each pair of the communications nodes responsive to a change in physical location of one of communications nodes.

7. The system of claim 1, wherein the sequence allocator is configured to generate the transmission sequence to include a transmission length or a maximum transmission length allocated for each transmission of at least some of the plurality of communications nodes.

8. A system for managing network communications, the system comprising:

a transceiver of a first communications node of a plurality of communications nodes, the transceiver configured to:

receive, from a second communications node of the plurality of communications nodes, a transmission sequence generated according to a communications cost value determined for each pair of the communications nodes, the transmission sequence specifying an order of transmission for the plurality of communications nodes, the order of transmission indicating that a third communications node is to be followed by the first communications node as consecutive nodes for transmitting packets; and receive one or more first packets transmitted by the third communications node according to the transmission sequence; and a sequence manager of the first communications node configured to:

identify, from the transmission sequence, the first communications node as following the third communication node as consecutive nodes in the order of transmission;

determine that a packet of the one or more first packets received from the third communications node is a terminal packet; and initiate transmission of one or more second packets by the transceiver responsive to identifying the first communications node from the transmission sequence and to determining that the packet is the terminal packet.

9. The system of claim 8, wherein the communications cost value is determined according to one or more of: distance or probability of line of sight between the corresponding pair of communications nodes.

10. The system of claim 8, wherein the communications cost value is determined according to one or more of: priority, altitude, transmission strength, receiver sensitivity or signal-to-noise ratio corresponding to at least one communications node of the corresponding pair of communications nodes.

11. The system of claim 8, wherein the transceiver is further configured to periodically receive updates to the transmission sequence.

12. The system of claim 8, wherein the transmission sequence further specifies a transmission length allocated to each transmission of the third communications node, the sequence manager configured to detect that reception of the terminal packet has or should have just completed according to the specified transmission length.

13. A system for managing network communications, the system comprising:

a first communications node of a plurality of communications nodes, the first communications node having a transceiver and configured to:

determine a communications cost value for each pair of communications nodes in the plurality of communications nodes to communicate with each other;

generate, based on the communications cost value determined for each pair of the communications nodes, a transmission sequence specifying an order of transmission for the plurality of communications nodes, the order of transmission indicating that the first communications node is to be followed by a second communications node as consecutive nodes for transmitting packets;

initiate transmission of one or more first packets to other communication nodes of the plurality of communication nodes according to the transmission sequence; and communicate, via the transceiver, the transmission sequence to the other communications nodes of the plurality of communications nodes; and the second communications node configured to:

receive, from the first communications node, the transmission sequence;

receive the one or more packets transmitted by the first communications node according to the transmission sequence;

identify, from the transmission sequence, the second communications node as following the first communication node as consecutive nodes in the order of transmission;

determine that a packet of the one or more packets received from the first communications node is a terminal packet; and initiate transmission of one or more second packets according to the transmission sequence responsive to identifying the second communications node from the transmission sequence and to determining that the packet is the terminal packets.

14. The system of claim 13, wherein the first communications node is configured to determine each communications cost value according to one or more of: distance or probability of line of sight between the corresponding pair of communications nodes.

15. The system of claim 13, wherein the first communications node is configured to determine each communications cost value according to one or more of: priority, altitude, transmission strength, receiver sensitivity or signal-to-noise ratio corresponding to at least one communications node of the corresponding pair of communications nodes.

16. The system of claim 13, wherein the first communications node is configured to transmit the one or more packets to others in the plurality of communications nodes.

17. The system of claim 13, wherein a first sequence allocator of the first communications node and a second sequence allocator of a communications node from a second plurality of communications nodes, negotiate to have a first portion and a second portion of total network capacity allocated, respectively, to the first sequence allocator to manage communications of the plurality of communications nodes and, to the second sequence allocator to manage communications of the second plurality of communications nodes.

18. The system of claim 13, wherein the first communications node is further configured to determine an updated communications cost value for each pair of the communications nodes responsive to a change in physical location of one of the communications nodes.

19. The system of claim 13, wherein the first communications node is configured to generate the transmission sequence to include a transmission length allocated to each transmission of the first communications node, and the second communications node is configured to detect that reception of the terminal packet has or should have just completed, according to the included transmission length.

20. The system of claim 13, wherein the first communications node is further configured to allocate, according to a network capacity allocated to the plurality of communications nodes, a transmission length for each transmission of at least some of the plurality of communications nodes, and to include the allocated transmission length in the transmission sequence.

* * * * *